Feb. 23, 1971 W. G. ROWELL 3,566,398
CONDITION MONITORING SYSTEM
Filed Feb. 14, 1968 3 Sheets-Sheet 1

INVENTOR.
WILLIAM G. ROWELL
ATTORNEYS

INVENTOR.
WILLIAM G. ROWELL

United States Patent Office 3,566,398
Patented Feb. 23, 1971

3,566,398
CONDITION MONITORING SYSTEM
William G. Rowell, 18 Williams St.,
Canton, Mass. 02021
Filed Feb. 14, 1968, Ser. No. 705,347
Int. Cl. G08b 23/00, 29/00
U.S. Cl. 340—409                                       13 Claims

ABSTRACT OF THE DISCLOSURE

A condition monitoring system having means for sensing and indicating failures in the components of the system. The system includes a series circuit including one or more impedances and at least one variable impedance sensing element. Means for producing a signal responsive to the monitored condition is connected across one of the impedances and is responsive to the impedance of the sensor. A second signal producing means is connected across two junctions of the circuit and is responsive to operational changes which may occur in the components of the system. A third signal producing means combines the first two signals to provide a signal which is responsive to both the monitored condition changes and operational changes in the system components.

FIELD OF THE INVENTION

This invention relates in general to condition monitoring system and more particularly to a highly reliable condition monitoring system which includes apparatus for detecting and indicating operational changes in the sensor and the other system components.

DISCUSSION OF THE PRIOR ART

Systems for monitoring various processes and conditions for purposes of control or alarm or both, have countless applications in all phases of industry and in our society in general. Many of these systems employ sensing elements which have variable impedances, including such well known devices as photocells, thermistors, bimetallic switches and induction coils. In a monitoring system of the type with which we are presently concerned, the sensing devices in the system are employed to actuate an alarm indicator, and external controls if desired, upon detecting the existence of a predetermined condition. Such a system is generally designed to act in a predetermined manner upon exposure of its sensors to the presence or absence of an external stimulant.

However, despite the fact that such monitoring systems have long been in widespread use, they generally have not been immune from malfunction due to component failures, particularly such failures as open or short circuits in the sensing elements themselves. Furthermore, failures in circuit components and wiring may occur in such a manner that no indication of trouble whatever is provided by the system. Such failures are termed "unsafe" failures and are generally considered inherent possibilities. Prior systems have provided for what are termed "safe" failures where the monitoring system provides an indication of trouble which is similar to the indication of the detected condition. However, not all possible prior art system failures are safe. An unsafe failure may lead to uneconomical or possibly dangerous consequences, depending upon the condition being monitored.

In actual operating situations, thermistors, photocells, and the like are subject to shorting out defects for various reasons including fatigue, excessive dampness, excessive temperature and other environmental conditions. In most prior art monitoring systems a shorted sensor, or the wiring thereto, will cause the system to fail to provide any indication whatever when the predetermined event to be detected occurs. For example, a photosensor which is normally exposed to light has a low electrical resistance. If the photosensor becomes shorted, it also presents a low internal resistance. This change causes no indication to occur and the system continues to indicate that conditions are normal while being unable to detect any later condition changes. This is an example of an unsafe failure in the monitoring system.

Various solutions to this problem have been proposed, including the utilization of various symmetrical bridge arrangements for detecting internal system failures. A typical approach to the detection of failures of electrical components within a control circuit is disclosed in U.S. Pat. No. 3,105,182 to H. H. Kopple et al. The Kopple patent is primarily concerned with checking the components internal to a control circuit which is indirectly actuated by a sensing device. It employs a balanced symmetrical bridge circuit wherein an asymmetrical failure results in an unbalanced condition which then causes an alarm indication to be given. However, in such systems a symmetrical circuit failure will not produce a detectable result and therefore no indication will be given of such failure. A symmetrical failure is one wherein similar failures occur in two legs of the bridge which do not unbalance the bridge. If monitoring systems which do not have any means for detecting unsafe component failures or which can detect only asymmetrical failures are set up to monitor a continuous process of operation, the "controlled" process may be allowed to operate in a "runaway," unmonitored condition when certain failures occur in the detecting system itself. This problem is well known and has manifested itself on numerous occasions, such as by boiler explosions.

Another method of protecting against monitoring system failures, which is used in particularly sensitive situations where an undetected failure of the sensing system could produce calamatous results, is to employ multiple independent monitoring systems. This, in some cases, provides continuous observation as required, but at a significant increase in cost and complexity over the price of a single monitoring system. However, such methods may also be circumvented if unsafe failures, which could, for example, be caused by abnormal voltage or environmental conditions, should simultaneously occur in the multiple systems.

SUMMARY OF THE INVENTION

This invention is directed toward making condition monitoring systems essentially free from dangerous malfunctions caused by component failures internal to the system itself. It does so by providing a continuous electrical circuit check of the operational integrity of the sensor and of the entire monitoring system.

Broadly speaking, the invention comprises a system having a series circuit having four definable junctions and including suitable resistors and variable impedance sensing elements. A source of electrical power is applied across a pair of the junctions in the series circuit. A signal producing means is connected across one of the resistors, its signal being responsive to the condition being monitored. This combination of signal producing means and resistor is herein termed the "condition circuit." A second signal producing means is connected between the other two junctions, its signal being responsive to the occurrence of undesired operational changes or failures in the system components. The circuitry connected across this latter pair of junctions is herein termed the "fault circuit." The signals from both the above-mentioned signal producing means may be combined to provide indication of the state of the object or process being monitored as well as the operational integrity of the individual components of the monitoring system. Additionally, a circuit constructed according to this invention may be modified to indicate variations in the monitored condition, such as high or low readings, for purposes of controlling a continuous process, while still checking for internal component failures.

A basic feature of this invention is that while the prior art devices depend upon a balance or an unbalance in a bridge circuit, this device operates to give the proper monitoring indications as well as component integrity indications completely independently of any balance or unbalance. Thus this system detects and indicates component failures of all types, including those which would be undetectable in a prior art bridge circuit because they are symmetrical and do not create a bridge unbalance.

DESCRIPTION OF THE PREFERRED EMBODIMENT

Figure 1:
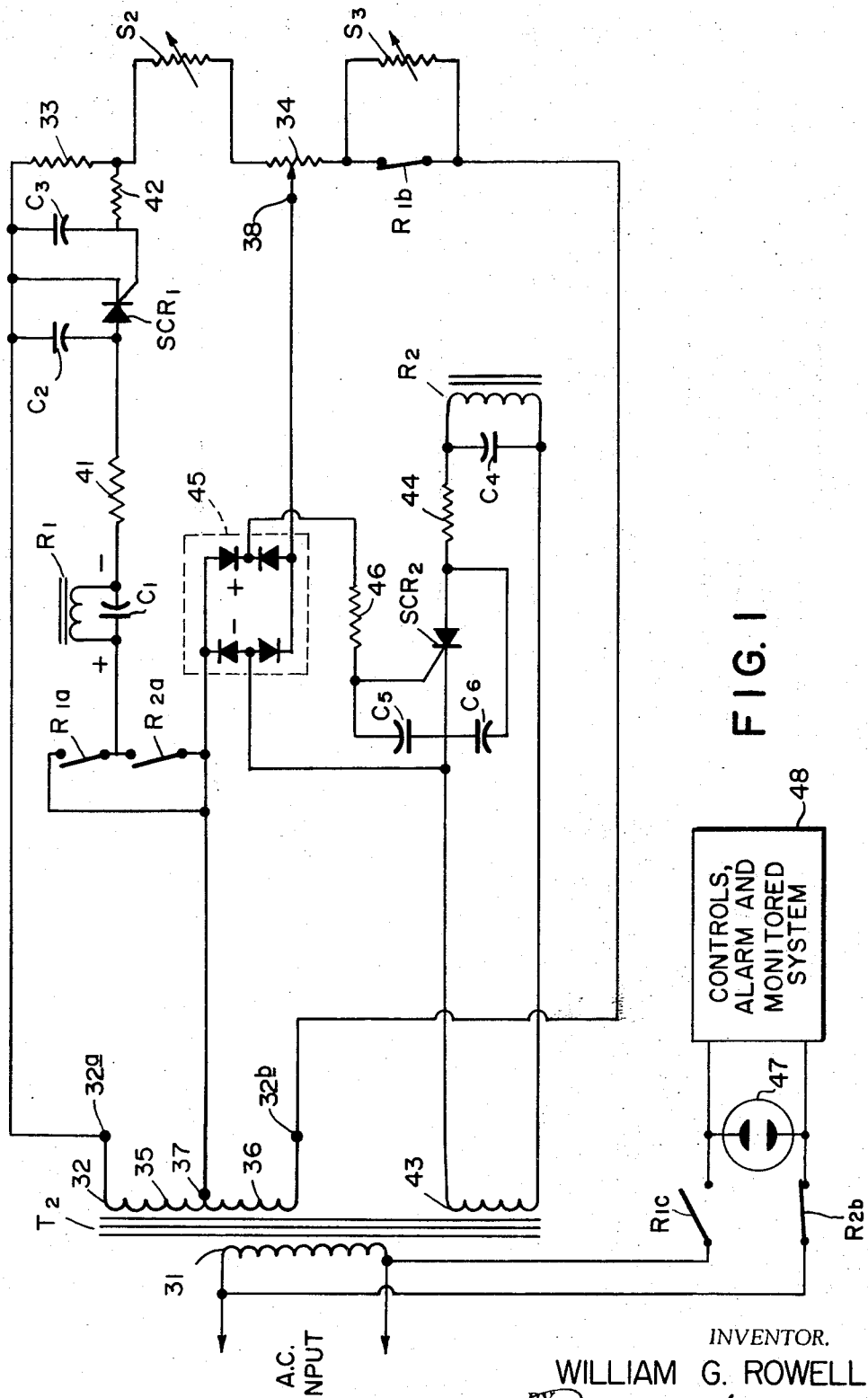
FIG. 1 is a schematic representation of a condition monitoring system constructed in accordance with the principles of this invention.

With reference now to FIG. 1 of the drawing, there is shown a system which makes practical application of the principles of this invention. This system may employ photosensors or a dual thermistor sensing arrangement which may, for example, be used in connection with a liquid level monitoring system. FIG. 1 also incorporates a provision for a dynamic pre-operation system integrity check and is shown in its pre-energized state.

An AC input signal is applied to input winding 31 of transformer T2. Winding 32 of transformer T2 is connected across the pair of junctions 32a, 32b. Winding 32 is divided by junction 37 into two output portions 35, 36 which provide equal outputs of opposite electrical phase.

The main series circuit connected across winding 32 comprises resistor 33, sensor $S_2$, potentiometer 34 and sensor $S_3$. Resistor 33 is part of the condition circuit while the fault circuit is connected between junctions 37, 38. Junction 38 is the sliding tap of potentiometer 34 which divides the effective resistance of the potentiometer. Sensors $S_2$, $S_3$ may be remotely located from the remainder of the circuit components as required for particular applications.

The condition circuit may be traced from junction 37 through either of normally open contacts $R_{1a}$ or $R_{2a}$, through the parallel combination of relay $R_1$ and smoothing capacitor $C_1$, through resistor 41 to the anode of silicon controlled rectifier $SCR_1$. Resistor 33 is connected between the cathode and gate of $SCR_1$ through gate current limiting resistor 42. The potential drop across resistor 33 varies directly with the changes in internal impedance of the sensors in the circuit, thus providing a source of indications for such changes. Capacitor $C_2$ connected between anode and cathode and capacitor $C_3$ connected between cathode and gate of $SCR_1$ protect the rectifier from voltage transients. Since silicon controlled rectifiers, when triggered, act merely as half wave rectifiers with an alternating current applied across the cathode and anode terminals, a pulsating direct current will exist in the circuit from terminal 37 through relay $R_1$ and $SCR_1$ back to junction 32a when $SCR_1$ is conducting. Smoothing capacitor $C_1$ prevents relay $R_1$ from chattering when subjected to these pulsations.

A portion of the fault circuit is connected across output winding 43 of transformer T2. This portion is a series combination of silicon controlled rectifier $SCR_2$, resistor 44, and relay $R_2$. Smoothing capacitor $C_4$ is connected across relay $R_2$ and functions similarly to capacitor $C_1$. Capacitors $C_5$ and $C_6$ function in a manner similar to capacitors $C_3$ and $C_2$ respectively. Rectifier $SCR_2$ is controlled by fault circuit rectifier 45, shown here as a full wave rectifier, which is connected between junctions 37, 38. The positive terminal of rectifier 45 is connected to the gate of $SCR_2$ through resistor 46 and the negative side is connected to the cathode of $SCR_2$. Resistors 44 and 46 are current limiting devices.

An indicating and control circuit, responsive to outputs from both the fault and condition circuits, is connected from one side of winding 31 through normally closed contact $R_{2b}$, through appropriate controls 48 and back through contact $R_{1c}$ to the other side of winding 31. Indicator lamp 47 is connected across this circuit in parallel with controls 48.

When both the monitoring and monitored systems are operating normally, rectifier $SCR_1$ is conducting and relay $R_1$ is energized while both rectifier $SCR_2$ and relay $R_2$ are de-energized. $SCR_2$ is designed to conduct and actuate relay $R_2$ when a predetermined amount of potential exists across rectifier 45. Although the circuit of FIG. 1 when operating normally may have a small potential difference between junctions 37, 38, the resulting small voltage across rectifier 45 is insufficient to trigger $SCR_2$.

Before the system of FIG. 1 settles down to normal monitoring operation, however, a pre-operational dynamic check of the system is automatically conducted. Upon initial energization of winding 31, normally closed contact $R_{1b}$ shorts out sensor $S_3$ causing a substantial potential difference to occur between junctions 37, 38. With the circuit in this state a potential exists across rectifier 45 which is large enough to supply the necessary DC potential to trigger $SCR_2$, which in turn energizes relay $R_2$. Contact $R_{2a}$ then closes completing the circuit from junction 37 through contact $R_{2a}$, relay $R_1$, resistor 41 and $SCR_1$ back to junction $32_a$. With $S_3$ shorted a substantial current exists in the series circuit creating a voltage drop across resistor 33. This potential is applied between the gate and cathode of $SCR_1$ and is sufficient to trigger this device into operation. With $SCR_1$ conducting relay $R_1$ is energized and locks itself in by closing normally open contact $R_{1a}$ to maintain the circuit just mentioned from junction 37 to junction 32a. Also at this time normally closed contact $R_{1b}$ is opened to place sensor $S_3$ in the series circuit and substantially reduce the potential difference between junctions 37, 38. With the system in this condition, the voltage supplied to the gate of $SCR_2$ by rectifier 45 is insufficient to maintain $SCR_2$ in a conducting state. It, therefore, ceases to conduct and relay $R_2$ consequently drops out. This opens contact $R_{2a}$, but since contact $R_{1a}$ is closed, the condition circuit through relay $R_1$ is maintained in operation. With relay $R_2$ de-energized, normally closed contact $R_{2b}$ is closed, normally open contact $R_{1c}$ is closed because relay $R_1$ is energized and the control circuit through lamp 47 and controls 48 is established. Having completed these preliminary operations, it is assured that when indicator lamp 47 is illuminated, the system and all of its components are operative. Upon completion of the pre-operational dynamic check the potential drop across resistor 33 though reduced, is sufficient to maintain $SCR_1$ conducting and indicator lamp 47 illuminated as an indication of proper operation of the system in what has been predetermined to be its normal state. This checking procedure may be initiated at any desired time by suitable automatic means or manually by simply providing a switch by which the input power may at will be disconnected from and reconnected to the system. During this checking period auxiliary means (not shown) may be included in controls 48 which prevent these controls from reacting in order to provide normal uninterrupted operation of the monitored system during this short operational check period.

Assuming that $S_2$ and $S_3$ are photosensors and that they are normally illuminated, failure of the monitored illumination will cause the internal electrical resistance of sensors $S_2$ and $S_3$ to increase, decreasing the current in the series circuit and the potential cross resistor 33. This turns rectifier $SCR_1$ off causing relay $R_1$ to drop out shorting sensor $S_3$. With $S_3$ shorted, a substantial potential difference exists between junctions 37, 38 causing rectifier $SCR_2$ to conduct and relay $R_2$ to pull in opening contact $R_{2b}$ in the indicating and control circuit. At this point both contacts $R_{1c}$ and $R_{2b}$ are open and indicator lamp 47 is off, indicating either some type of failure or that the condition to be sensed has occurred. Also at this time controls 48 are actuated to place the monitored system in a safe condition and sound an appropriate alarm, shown as part of block 48.

It can be easily seen that if either a short or an open circuit should occur in resistor 33 or 34, or in sensor $S_2$ or $S_3$, the potential drop across resistor 33 will change significantly. If the potential drop across resistor 33 increases, $SCR_1$ will continue conducting and the potential difference between junctions 37, 38 will increase to cause $SCR_2$ to conduct, energizing relay $R_2$ and opening contact $R_{2b}$ actuating controls and alarm 48 and causing lamp 47 to go out. A decrease in the potential drop across resistor 33 causes $SCR_1$ to cease conducting and relay $R_1$ to be de-energized opening contact $R_{1c}$ with the same result. Furthermore, a failure which causes relay $R_1$ to drop out causes sensor $S_3$ to be shorted out by contact $R_{1b}$, resulting in a substantial potential difference between junctions 37, 38. This causes $SCR_2$ to conduct energizing relay $R_2$. Contact $R_{2b}$ opens causing indicator lamp 47 to go out and controls and alarm 48 to be actuated. Although a nuisance shutdown of the operation of the monitored system may be the result of a monitoring system component failure, this is more desirable than allowing the operation to continue in an unmonitored or runaway condition.

If the system in FIG. 1 is designed as a liquid level monitoring apparatus, sensors $S_2$ and $S_3$ might be thermistors and could be chosen so that their operating temperatures (due to internal current flow) are higher than the desired temperature of the liquid to be monitored. The ohmic value of resistor 34 is so selected that it limits the current through sensors $S_2$ and $S_3$ and thus limits their temperature to a predetermined maximum. When the system of FIG. 1 is initially energized, thermistor sensors $S_2$, $S_3$ will be heated up and brought to their preselected operating temperatures. A rise of liquid to the level of one of the thermistors will result in a circuit change whereby junctions 37, 38 will have different potentials, thereby causing $SCR_2$ to conduct and $R_2$ to pull in, opening the indicating and control circuit at contact $R_{2b}$. When the liquid rises to such a level as to include both sensors, their temperatures drop and their internal electrical resistances increase, resulting in a decrease of current through resistor 33 with consequent lowering of potential drop across it to a level too low to hold $SCR_1$ conducting. Relay $R_1$ consequently drops out opening contacts $R_{1c}$ in the indicating and control circuit.

Although FIG. 1 is shown as a system having a specific embodiment including two sensors, it is to be understood that practically any number of sensors may be used and that various types of indicators, controls and alarms may be connected into the system in such a way that specific indications are given for the different possible failures, providing the operator with specific knowledge of the actual trouble which has occurred.

Figure 2:
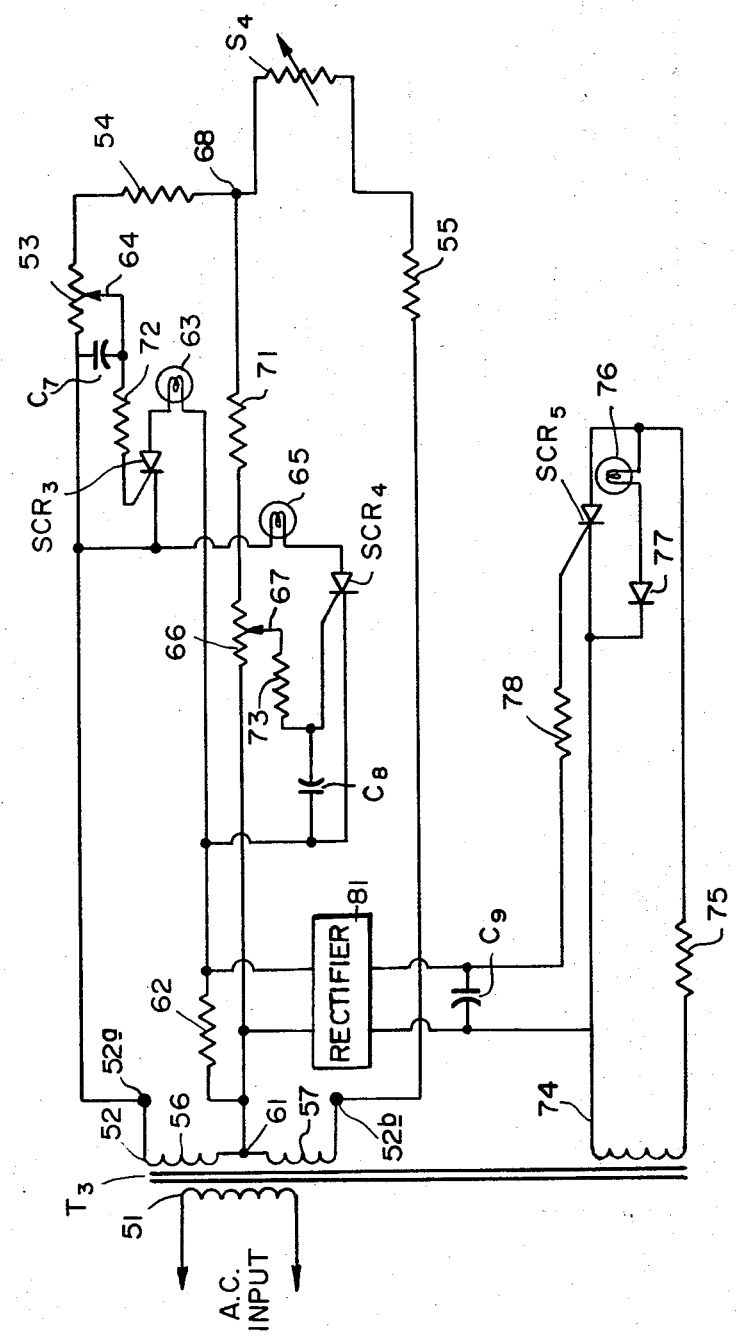
FIG. 2 is a schematic illustration of another embodiment of this invention.

Now turning to FIG. 2, there is depicted another very useful embodiment of the invention herein disclosed. This system, shown with a photocell as the sensor, may be made so sensitive that it can detect and indicate changes in illumination which are practically undetectable to the naked eye. The system in FIG. 2 is shown with indicating means only and is not here shown with control means. This is merely a matter of expository convenience and is in no way a limitation of the invention. Furthermore, this system is constructed without any mechanically operating relays so it is extremely reliable, long lasting and simple. For purposes of description we will here assume that the photosensor is illuminated with a predetermined desired intensity when the system is in its normal operating state. Such a system may be used to detect changes in illumination as might result where a continuous process, such as the position of the edge of an endless moving strip of material, is being monitored.

In a manner similar to the previous embodiment, an input signal is applied to input winding 51 of transformer $T_3$. Winding 52 of transformer $T_3$ is connected across the pair of junctions 52a, 52b. Winding 52 is divided by junction 61 into two output segments 56, 57 which provide equal outputs of opposite electrical phase. The main series circuit connected across winding 52 includes potentiometer 53, resistor 54, sensor $S_4$ and resistor 55. Junctions 61, 68 correspond to junctions 37, 38 of FIG. 1. Photosensor $S_4$ has an internal resistance which is continuously variable as a function of the intensity of the light to which it is exposed. Although the remaining circuitry is connected to the system very similarly to FIG. 1, the total function has been sufficiently modified so that it is not appropriate to label specific parts as condition and fault circuits. In this case there are HIGH, LOW and NORMAL indicating circuits. However, the HIGH indicating circuit is analogous to the condition circuit, the LOW indicating circuit is analogous to the fault circuit, and the NORMAL indicating circuit combines the signals from the other two circuits and is analogous to the indicating and control circuit.

The HIGH indicating circuit is controlled by potentiometer 53 and may be traced from junction 61 through resistor 62, indicator lamp 63, silicon controlled rectifier $SCR_3$ and back to winding 52 at junction 52a. The gate of $SCR_3$ is connected to tap 64 and the cathode of $SCR_3$ is connected to junction 52a so that the potential drop across the portion of potentiometer 53 included in the HIGH indicating circuit provides the triggering voltage for $SCR_3$. The action of $SCR_3$ and consequently of lamp 63 is variably controlled by means of tap 64 of potentiometer 53.

The LOW indicating circuit has two portions, the fault portion and the indicating portion. The fault portion comprises potentiometer 66 and resistor 71 connected in series between junctions 61 and 68. The indicating portion may be traced from junction 61 through resistor 62, silicon controlled rectifier $SCR_4$, lamp 65 and back to junction $52_a$. The gate of $SCR_4$ is connected to sliding tap 67 of potentiometer 66 to provide the triggering voltage therefor. The action of $SCR_4$ and consequently of lamp 65 is variably controlled by means of tap 67 of potentiometer 66. Both $SCR_3$ and $SCR_4$ have their associated protective devices; resistor 72 and capacitor $C_7$ operate with $SCR_3$; resistor 73 and capacitor $C_8$ operate with $SCR_4$.

The NORMAL indicating circuit is powered by output winding 74 of transformer $T_3$ which is connected across the series circuit of resistor 75, lamp 76 and diode 77. The operation of this indicating circuit is controlled by silicon controlled rectifier $SCR_5$, the gate and cathode of which are connected across resistor 62 through rectifier 81. It should be observed that resistor 62 is common to all three of the indicating circuits, thus making the operation of $SCR_5$, which is responsive to the potential across resistor 62, dependent upon the condition of the HIGH and LOW indicating circuits. $SCR_5$ has as its protective components resistor 78 and capacitor $C_9$. The anode and cathode of $SCR_5$ are connected across the series combination of diode 77 and lamp 76 and when $SCR_5$ is triggered into a conducting state it effectively shorts the lamp and diode. Thus whenever an abnormal condition exists in the system, the potential drop across resistor 62 increases due to an increase in the potential difference between junctions 61, 68 causing lamp 76 to go out as $SCR_5$ begins to conduct and shorts out the lamp and diode.

Since the potentials across potentiometers 53 and 66 control the action of $SCR_3$ and $SCR_4$ respectively, the settings of sliding taps 64 and 67 control the operation of the entire system. With sensor $S_4$ illuminated with the desired intensity, sliding tap 64 may be so adjusted as to make $SCR_3$ either conduct or not conduct. Since lamp 63 is the high condition indicator, that is, it is intended to be energized when too much illumination is directed onto sensor $S_4$, sliding tap 64 should be set low enough so that a significant decrease in the resistance of sensor $S_4$ caused by increased illumination will result in an increased voltage drop across potentiometer 53 between the cathode and gate of $SCR_3$. A voltage drop of a predetermined amount will cause $SCR_3$ to conduct and lamp 63 to light, indicating a high illumination condition.

This indication signal could easily be connected with a control system which acts to adjust the operation being monitored so as to reduce the amount of illumination and thereby deenergize $SCR_3$ and lamp 63.

In a similar manner sliding tap 67 of potentiometer 66 may be adjusted so that lamp 65 and $SCR_4$ are off when sensor $S_4$ is illuminated by light of the desired intensity. In this indicating circuit lamp 65 will light when the illumination on sensor $S_4$ reaches a predetermined low level. The resulting increase in resistance of sensor $S_4$ causes an abnormal potential difference between junctions 61, 68 with a consequent increase in the voltage drop across potentiometer 66, causing $SCR_4$ to conduct and light lamp 65. It would be equally simple to connect a control circuit to the LOW indicating circuit to effect desired controls as mentioned above for the HIGH indicating circuit.

When the illumination of sensor $S_4$ is at the proper level neither $SCR_3$ nor $SCR_4$ conduct so that substantially no current flows in resistor 62 and consequently no triggering potential is applied to $SCR_5$ through rectifier 81. This condition allows lamp 76 to remain lighted, indicating that normal conditions exist in the system. However, when either $SCR_3$ or $SCR_4$ conducts, a current exists in resistor 62 which triggers $SCR_5$ through rectifier 81, effectively shorting lamp 76 and causing it to go out. At the same time the appropriate high or low indicator lamp, 63 or 65, is lighted to indicate the abnormal condition.

Potentiometers 53 and 66 may be so adjusted as to allow only a very narrow variation in the illumination of sensor $S_4$, or they may be set to allow relatively broad variations. Furthermore, they can be set to allow a broad high range and a narrow low range or vice versa. Thus, there is considerable control flexibility with this circuit configuration which is constructed in accordance with the principles of this invention.

Component failure indications are also provided for by this circuit in a manner similar to that of FIG. 1. For example, it can easily be shown that if a short should occur anywhere in the series circuit, $SCR_3$ will be triggered and indicator lamp 63 will indicate a high abnormal condition. If an open circuit should occur in the series circuit, $SCR_4$ will be triggered and indicator lamp 65 will indicate a low abnormal condition. Failures in the HIGH, LOW and NORMAL circuits will also be manifest by appropriate indications. Of course, failures which do not change the potential of junction 68, such as would be termed symmetrical failures in a bridge circuit, will also be indicated in a manner similar to those previously described.

The versatility and wide ranging usefulness of the circuit of FIG. 2 are particularly enhanced by the use of a sensor having a continuously variable internal resistance such as a photocell. However, it should be understood that such a device is not necessary for the concept of this invention and that practically any type of sensor which can be made to produce effects upon an electrical circuit can be used.

The importance of a fail-safe monitoring system for fuel burner applications is obvious. Photoelectric sensors are normally used in burner applications, but prior art systems are prone to failures due to unfavorable or unanticipated ambient conditions and due to failures of the sensor itself or in the wiring thereto. An open circuit in the sensor or its connected wiring usually results in a nuisance shutdown and is considered a safe failure. In such instances the burner or fuel control valve will be shut off and no more fuel will flow into the burner. However, if the wiring to the sensor is shorted from such causes as dampness or carbon soot accumulation, or if the sensor itself shorts due to such things as excessive ambient temperature, dampness, soot or fatigue, the flame monitoring system can be rendered incapable of reacting to subsequent loss of the flame. In such cases the fuel supply is uncontrolled and fuel is continuously fed to the burner. Such an occurrence is, of course, an unsafe failure.

Figure 3:
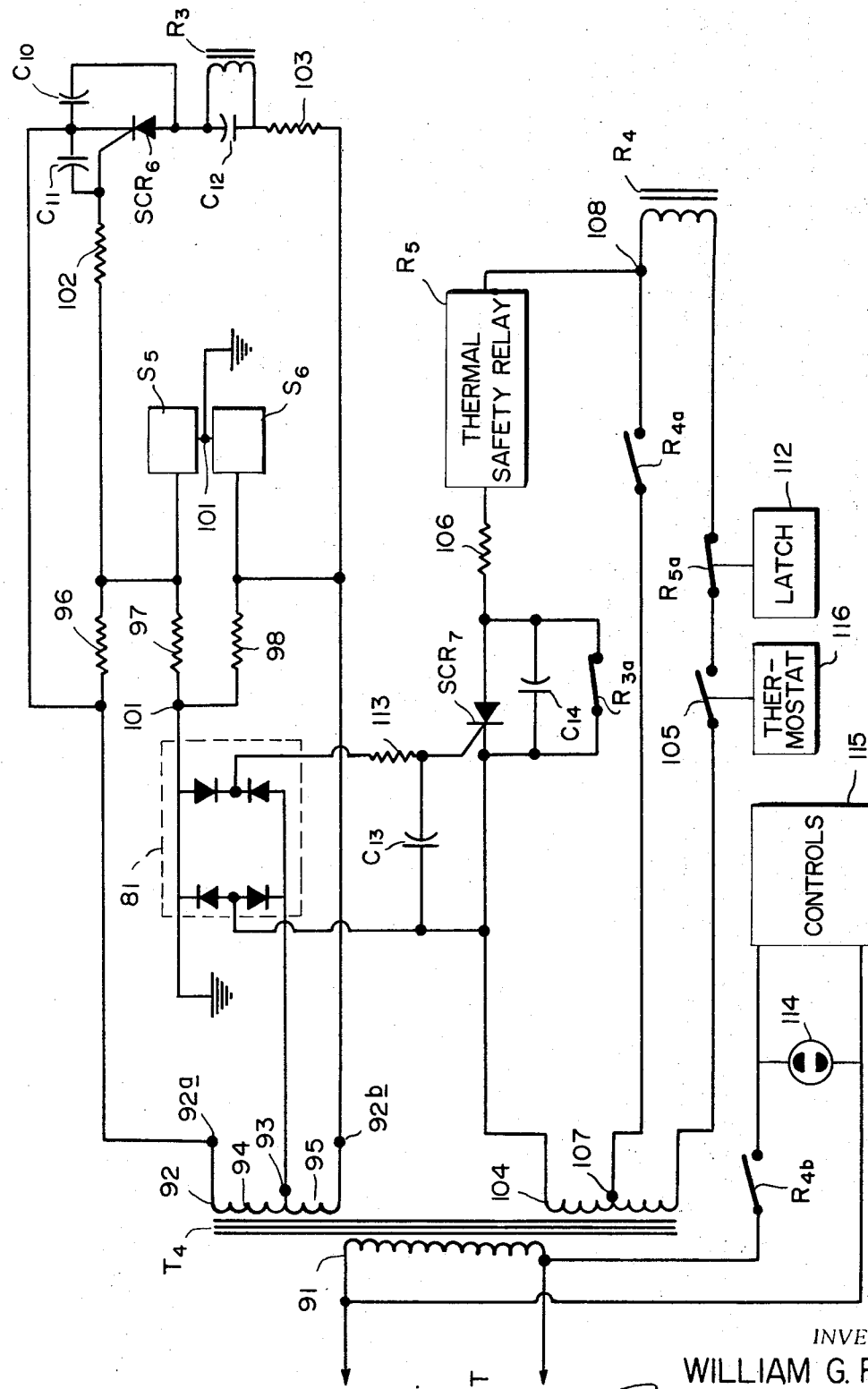
FIG. 3 is a schematic representation of still another embodiment of the invention.

In order to overcome the above enumerated disadvantages of prior art flame monitoring systems, the invention herein disclosed has been used as the basis of the system shown in FIG. 3 for monitoring fuel burners.

An A.C. input signal is applied to primary 91 of transformer $T_4$. Output winding 92 of transformer $T_4$ is connected across the pair of junctions 92a, 92b. Winding 92 is divided by junction 93 into two output segments 94, 95 which provide equal outputs of opposite electrical phase. The main series circuit connected across winding 92 includes resistor 96, the parallel combination of sensor $S_5$ and resistor 97 and the parallel combination of sensor $S_6$ and resistor 98. Junction 101 is located between the two parallel sensor combinations and is shown here for purposes of drawing simplicity as two separate junction points. However since both points are grounded, they may be described as a single junction. Connected between junctions 93 and 101 is rectifier 81 which is part of the fault circuit of this embodiment.

The condition sensing relay circuit corresponding to the condition circuit of FIG. 1 is also connected across junctions 92a and 92b. Its operation is controlled by the potential across resistor 96. The condition sensing relay circuit comprises silicon-controlled rectifier $SCR_6$, relay $R_3$ and resistor 103. Resistor 96 is connected between the cathode and gate terminals of $SCR_6$ so that the potential across this resistor controls the operation of $SCR_6$. Capacitors $C_{10}$, $C_{11}$ and current limiting resistor 102 are protective devices associated with $SCR_6$. Resistor 103 is designed to limit the inductive current from the winding of relay $R_3$ which is applied to $SCR_6$. Smoothing capacitor $C_{12}$ is connected in parallel with relay $R_3$ to prevent the relay contacts from chattering when the relay is energized with pulsating D.C.

The operating portion of the fault circuit is connected across output winding 104 of transformer $T_4$. This circuit may be traced from one side of winding 104 through the normally open thermostat contact 105, through the normally closed safety relay contact $R_{5a}$, through the winding of relay $R_4$, through the heating winding of thermal safety relay $R_5$, through current limiting resistor 106 and through the parallel combination of $SCR_7$ and normally closed relay contact $R_{3a}$ back to the other side of winding 104. The function of relay contact $R_{4a}$ connected between junctions 107 and 108 will be explained below. Latch apparatus 112 is connected to relay contact $R_{5a}$ and its function will also be explained later. Rectifier 81 is connected between the cathode and gate terminals of silicon-controlled rectifier $SCR_7$ to control the operation thereof. Capacitors $C_{13}$ and $C_{14}$ and resistor 113 are protective devices associated with $SCR_7$.

Indicating and control devices are connected to input winding 91 of transformer $T_4$ in a manner similar to that of FIG. 1. Indicator lamp 114 and control apparatus 115 are connected in parallel across input winding 91 and their operation is directly controlled by normally open relay contact $R_{4b}$.

When the system is in its normal standby state, that is when the burner is off and there is no call for heat by the thermostat, all relays are de-energized, both silicon-controlled rectifiers are off and all relay contacts are in the positions shown in FIG. 3. When thermostat 116 makes a call for heat, it closes contact 105 which completes the circuit from coil 104, through relay contacts 105 and $R_{5a}$, through relays $R_4$ and $R_5$ and through contacts $R_{3a}$ back to the other end of winding 104. The establishment of this circuit causes relay $R_4$ to be energized, closing contact $R_{4a}$ by which relay $R_4$ locks itself in so that it may be de-energized only if either contact 105 or $R_{5a}$ is opened. At the same time relay $R_4$ closes contact $R_{4b}$ so that lamp 114 indicates normal burner operation and controls 115 are actuated to start the burner. Assuming that burner flame is established within a predetermined safety period as governed by thermal safety relay $R_5$, sensors $S_5$, $S_6$ will be illuminated, thus decreasing their resistance and increasing the potential drop across resistor 96. This increase in potential drop causes $SCR_6$ to conduct, thus energizing relay $R_3$. Upon energization of relay $R_3$, contact $R_{3a}$ opens and, since $SCR_7$ is off, thermal safety relay $R_5$ is removed from the circuit. Relay $R_4$ remains energized through contacts 105, $R_{5a}$ and $R_{4a}$. Under normal circumstances, the system will remain in this condition with lamp 114 lighted until thermostat 116 opens contact 105 when it detects a predetermined temperature.

When contact 105 opens, relay $R_4$ drops out and indicator lamp 114 goes off. By means of controls 115 the fuel supply to the burner will at this time be turned off. With the fuel flow having ceased, the flame in the burner will shortly cease and the resistance of sensors $S_5$ and $S_6$ will increase as they receive less light. This will cause the potential across resistor 96 to decrease turning off $SCR_6$ and de-energizing relay $R_3$. With relay $R_3$ de-energized, contact $R_{3a}$ closes and the entire system returns to its standby state.

If, after the call for heat by thermostat 116, the flame in the burner is not properly established, $SCR_6$ and relay $R_3$ will not be energized. However, relay $R_4$ becomes energized and contact $R_{4a}$ closed, and since contact $R_{3a}$ remains closed, the heating coil of relay $R_5$ will heat up due to the flow of current through it. After a predetermined safety period, if no flame has been established, relay $R_5$ opens contact $R_{5a}$ de-energizing relay $R_4$ and opening contact $R_{4b}$ so that the burner controls 115 are turned off and fuel flow to the burner is stopped.

Whenever the heating winding of relay $R_5$ heats sufficiently to open contact $R_{5a}$, they are held open by latch 112 until the latter is manually reset. Thus the combination of lamp 114 being dark and latch 112 being actuated shows that there is trouble in the burner controls or in the monitoring system. The trouble can be easily traced once its existence is known.

If shorts or false grounds should occur any place in the photocell circuit or in the photocells themselves during a standby or pre-operational period, the action of the system will be similar to the action when the sensors are illuminated. Thus with decreased resistance in the photocell circuit, the potential across resistor 96 increases, turning on $SCR_6$ and energizing relay $R_3$. With relay $R_3$ energized, contact $R_{3a}$ is opened and relay $R_4$ is prevented from pulling in when thermostat contact 105 closes when thermostat 116 calls for heat. Thus if the sensor circuit is inoperative, initial start-up of the burner is prevented even though a call for heat is made.

If an open circuit should develop in the sensor circuit during a standby period, the burner will be started and the flame established in a normal fashion when contact 105 is closed. However, since the sensor circuit resistance will not be lowered by the establishment of a flame, the potential across resistor 96 will not increase and consequently relay $R_3$ will not be energized. This means that contact $R_{3a}$ remains closed and the current continues to flow through thermal safety relay $R_5$. In this instance the burner will start up but as soon as the heater winding of relay $R_5$ reaches its predetermined temperature, contact $R_{5a}$ opens and the burner is shut off due to de-energization of relay $R_4$. To prevent the system from continuously going on and off under such circumstances, relay contact $R_{5a}$ is connected to latch 112 so that when relay $R_5$ pulls in, contact $R_{5a}$ is latched open and must be manually reset. The fact that the manual reset button must be pushed is an indication of trouble in the monitoring system. This short initial period of burner start-up is termed the "trial for burner ignition period" in the trade.

Should the burner flame be unintentionally lost during an operating period when both relays $R_3$ and $R_4$ are energized, the internal resistance of the photocells will increase to a point at which the potential drop across resistor 96 decreases sufficiently to turn off $SCR_6$. When $SCR_6$ goes off, relay $R_3$ becomes de-energized and contact $R_{3a}$ closes thus closing the circuit through thermal safety relay $R_5$. This condition will, after the predetermined time delay built into relay $R_5$ as previously described, cause the safety contact $R_{5a}$ to open and relay $R_4$ to drop out, opening contact $R_{4b}$ and turning off the burner.

If shorts or false grounds should occur in the sensor circuit during an operating period, an abnormal potential difference will exist between terminals 93 and 101 which will turn on $SCR_7$ through rectifier 81. Since the burner is operating at this time and relay $R_4$ is already energized, a circuit is completed through contact $R_{4a}$, thermal safety relay $R_5$ and $SCR_7$. After the predetermined time delay of relay $R_5$ safety contact $R_{5a}$ is opened and the burner is turned off. If an open sensor should occur during an operating period, the potential across resistor 96 will decrease turning off $SCR_6$ and de-energizing relay $R_3$. This establishes a circuit through contacts $R_{4a}$ and $R_{3a}$ in the thermal safety relay circuit which, after the time delay established by relay $R_5$, turns off the burner.

The function of resistors 97, 98 which parallel sensors $S_5$, $S_6$ respectively is to provide a sufficient current through rectifier 81 to actuate $SCR_7$ when an abnormal condition circuit exists, such as an open photocell or other series circuit component. For example, during standby periods when no flame exists, the photocells have a very high resistance. If one of the sensors should be open circuited, the high impedance of the other sensor would not otherwise permit a sufficiently abnormal potential difference between junctions 93, 101 to occur to energize $SCR_7$. However, shunting the sensors with resistors which have a much lower value of resistance than the unilluminated sensors permits sufficient change to occur when a sensor opens so that current will commence to flow between junctions 93, 101. When thermostat 116 closes contact 105 to energize relay $R_4$, $SCR_7$ becomes energized immediately. This maintains a completed circuit through thermal circuit relay $R_5$ no matter what relay $R_3$ should do. Relay $R_5$ will heat up during its predetermined delay time and will open safety contact $R_{5a}$ as previously described.

The dynamic pre-operational self-checking technique described in conjunction with FIG. 1 may readily be incorporated into FIG. 3 if desired.

The embodiments described herein indicate to some degree the wide range of different forms a system may take and still employ the principles of this invention. For example, many sensor types may be employed as required by the various types of conditions which must be monitored. The indicating signal impedances are described herein as resistors, but other impedance devices could be used as desired. Of course, the control devices which the systems of this invention may actuate are unlimited. Having described the invention, a large number of modifications and improvements will likely occur to those skilled in this art, and the invention disclosed herein should be construed as limited only by the spirit and scope of the appended claims.

What is claimed is:

1. A condition monitoring system having means for checking the integrity of the components thereof, comprising:
   a series circuit having first and second pairs of junctions and a plurality of impedance means including variable impedance sensor means and non-sensor impedances;
   means adapted for applying an electrical potential across said first pair of junctions;
   means connected across one of said non-sensor impedance means for producing a first signal related to the impedance of said sensor means;
   means connected across said second pair of junctions for producing a second signal related to operational changes in any of the components of said system; and
   means for combining said first and second signals to provide a third signal responsive to the condition being monitored and to the operational changes in the components of said system.

2. The condition monitoring system recited in claim 1, wherein:
   the impedance of said sensor means is responsive to the state of the condition being monitored.

3. The condition monitoring system recited in claim 2, wherein:
   said potential applying means includes a transformer having an input and a plurality of output windings, one of said output windings having a center tap and being connected across said first pair of junctions; and
   said second pair of junctions comprises a first junction and a second junction, said first junction being said center tap and said second junction being located between two of said impedance means in said series circuit.

4. The condition monitoring system recited in claim 3, and further comprising:
   means responsive to said third signal for indicating the state of the condition being monitored and the operational condition of the components of said system.

5. The condition monitoring system recited in claim 4, and further comprising:
   means responsive to said third signal for controlling the condition being monitored.

6. The condition monitoring system recited in claim 5, and further comprising:
   means responsive to said first signal for visually indicating the state of the condition being monitored; and
   means responsive to said second signal for visually indicating the operational condition of the components of said system.

7. The condition monitoring system recited in claim 6, wherein:
   said sensor means is a photoelectric sensor.

8. The condition monitoring system recited in claim 6, wherein:
   said sensor means is a thermistor.

9. The condition monitoring system recited in claim 5, wherein:
   said first signal producing means includes a resistor in said series circuit and a first relay operating in response to the potential across said resistor, said first relay having a plurality of contact pairs;
   said second signal producing means includes a rectifier connected across said second pair of junctions and a second relay operating in response to the electrical output of said rectifier, said second relay having a plurality of contact pairs; and
   said indicating means responsive to said third signal is connected across said transformer input winding through contact pairs of said first and second relays.

10. The condition monitoring system recited in claim 9, wherein:
   said sensor means comprises first and second continuously variable impedance sensors connected on opposite sides of said second junction of said second junction pair.

11. The condition monitoring system recited in claim 10, and further comprising:
   switching means connected in said system for conducting a pre-operational dynamic check of the physical and electrical operating integrity of the components of said system, said switching means comprising contact pairs of said first and second relays.

12. A condition monitoring system having means for checking the integrity of the components thereof, comprising:
   a series circuit having first and second pairs of junctions and a plurality of impedance means including sensor means having a continuously variable impedance, the impedance of said sensor means being responsive to the state of the condition being monitored;
   a transformer having an input and a plurality of output windings, one of said output windings having a center tap and being connected across said first pair of junctions;
   means adapted for applying an electrical potential across said input winding;
   means connected across one of said impedance means for producing a first signal related to the impedance of said sensor means;
   first means connected to said first signal producing means for indicating an abnormality of a first type in said condition being monitored;
   means connected across said second junction pair for producing a second signal related to the impedance of said sensor means;
   second means connected to said second signal producing means for indicating an abnormality of a second type in said condition being monitored;
   means for combining said first and second signals to provide a third signal responsive to the condition being monitored; and
   third indicating means responsive to said third signal having first and second indicating conditions, said first condition indicating normal operation of said condition being monitored and said second condition indicating abnormal operating of said condition being monitored.

13. The condition monitoring system recited in claim 12, wherein:
   said first signal producing means comprises a first variable resistor within said series circuit and a first silicon controlled rectifier connected thereto;
   said first indicating means being connected from said first silicon controlled rectifier through a third resistor to said center tap;
   said second signal producing means comprises a second variable resistor and a second silicon controlled rectifier connected across said second variable resistor and said third resistor;

said second indicating means being connected from said second silicon controlled rectifier to one junction of said first junction pair;

said combining means comprising said third resistor, a fourth rectifier and a third silicon controlled rectifier connected to said fourth rectifier.

References Cited
UNITED STATES PATENTS
3,171,110   2/1965   Pearson ———————— 340—409

THOMAS B. HABECKER, Primary Examiner

U.S. Cl. X.R.

340—228